US006981827B2

(12) United States Patent
Bullock

(10) Patent No.: US 6,981,827 B2
(45) Date of Patent: Jan. 3, 2006

(54) CARGO RESTRAINT TORQUE APPARATUS

(76) Inventor: Matthew Bullock, 4509 N. 7th St., Arlington, VA (US) 22203

( * ) Notice: Subject to any disclaimer, the term of this patent is extended or adjusted under 35 U.S.C. 154(b) by 0 days.

(21) Appl. No.: 10/772,191

(22) Filed: Feb. 5, 2004

(65) Prior Publication Data
US 2005/0175427 A1 Aug. 11, 2005

(51) Int. Cl.
B60P 7/08 (2006.01)
(52) U.S. Cl. .............. 410/100; 410/98; 410/118
(58) Field of Classification Search .................. 410/36, 410/42, 97–98, 100, 118; 100/2, 5, 29, 32; 254/216–218, 213, 223, 369; 53/399, 462; 24/68 R, 68 CD, 68 BT, 909, 68 A, 69 B
See application file for complete search history.

(56) References Cited

U.S. PATENT DOCUMENTS

| | | |
|---|---|---|
| 2,269,286 A | 1/1942 | Ott |
| 3,547,457 A | 12/1970 | Langer |
| 3,612,463 A | 10/1971 | Grant |
| 3,848,889 A | 11/1974 | Sharrow |
| 3,897,919 A | 8/1975 | Weingarten |
| 3,910,558 A | 10/1975 | Brucker et al. |
| 4,054,226 A | 10/1977 | Bjelland et al. |
| 4,111,132 A | 9/1978 | Plut |
| 4,264,251 A * | 4/1981 | Blatt ............... 410/100 |
| 4,553,888 A | 11/1985 | Crissy et al. |
| 4,640,853 A | 2/1987 | Schmeal et al. |
| 4,846,610 A | 7/1989 | Schoenleben |
| 4,964,771 A | 10/1990 | Callihan |
| 5,037,256 A | 8/1991 | Schroeder |
| 5,062,751 A | 11/1991 | Liebel |
| 5,132,156 A | 7/1992 | Trassare, Jr. et al. |
| 5,139,842 A | 8/1992 | Sewell |
| 5,431,284 A | 7/1995 | Wilson |
| 5,484,643 A | 1/1996 | Wise et al. |
| 5,516,244 A | 5/1996 | Baka |
| 5,595,315 A | 1/1997 | Podd et al. |
| 5,784,761 A | 7/1998 | Allen |
| 5,846,038 A | 12/1998 | Bostelman |
| 5,855,459 A | 1/1999 | Krier et al. |
| 5,947,666 A | 9/1999 | Huang |
| 6,089,802 A * | 7/2000 | Bullock ............... 410/97 |
| 6,227,779 B1 * | 5/2001 | Bullock ............... 410/98 |
| 6,247,208 B1 * | 6/2001 | Creech |
| 6,368,036 B1 * | 4/2002 | Vario ............... 410/98 |
| 6,419,434 B1 | 7/2002 | Rahn |

(Continued)

FOREIGN PATENT DOCUMENTS

EP 1184436 A1 3/2002

(Continued)

OTHER PUBLICATIONS

"Hexacomb kraft honeycomb: Pactiv Panels" Sales Brochure, Copyright 1996.

Primary Examiner—Stephen Gordon
(74) Attorney, Agent, or Firm—Bradford E. Kile, Esq.; Kile, Goekjian, Reed & McManus

(57) ABSTRACT

A tensioning apparatus and torque rod for tensioning flexible load restraining strips for use in securing cargo within a transport container wherein the torque rod is composed of a high strength, light weight material that is easy to manipulate and comprises a torque rod with a pair of opposing tines and a longitudinal channel between the tines that gradually increases in width from a closed end or proximal portion of the rod to an open or distal end of the torque rod.

12 Claims, 8 Drawing Sheets

U.S. PATENT DOCUMENTS

| | | |
|---|---|---|
| 6,435,787 B1 | 8/2002 | John |
| 6,527,488 B2 | 3/2003 | Elze et al. |
| 6,533,513 B2 | 3/2003 | Kanczuzewski et al. |
| 6,568,636 B2 | 5/2003 | Fitzgerald |
| 6,607,337 B1 * | 8/2003 | Bullock .................. 410/97 |
| 6,702,532 B1 | 3/2004 | Throener |
| 6,758,644 B1 * | 7/2004 | Vick ...................... 410/100 |
| 6,896,459 B1 * | 5/2005 | Bullock .................. 410/97 |
| 6,923,609 B2 * | 8/2005 | Bullock .................. 410/97 |
| 2003/0206782 A1 | 11/2003 | Toglia |

FOREIGN PATENT DOCUMENTS

| | | |
|---|---|---|
| WO | WO09301979 A1 | 2/1993 |

\* cited by examiner

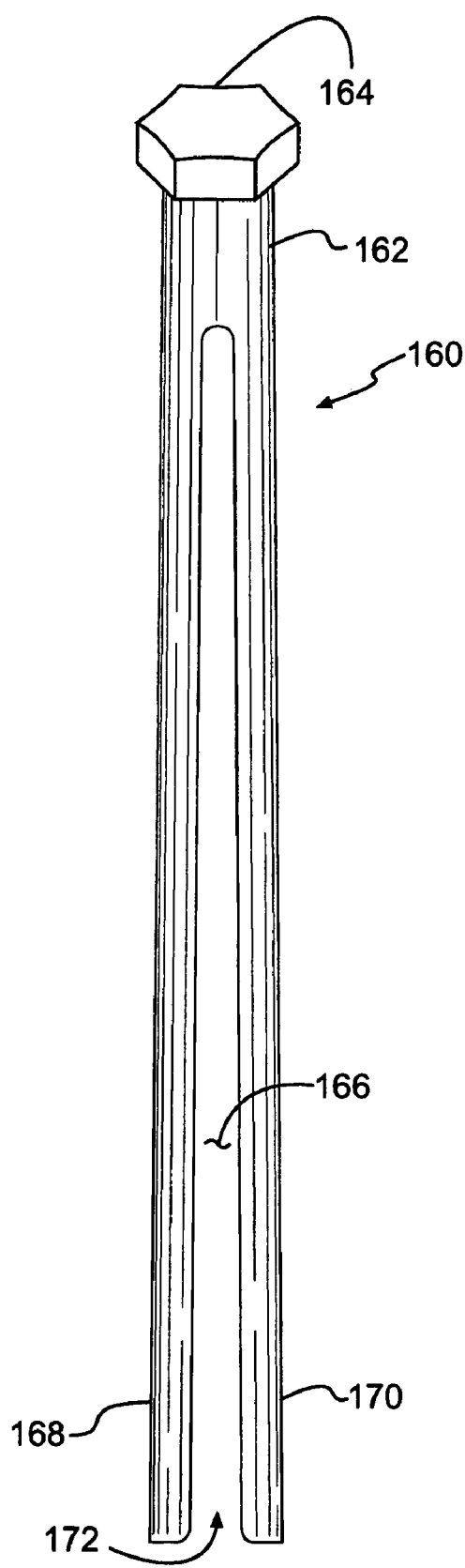
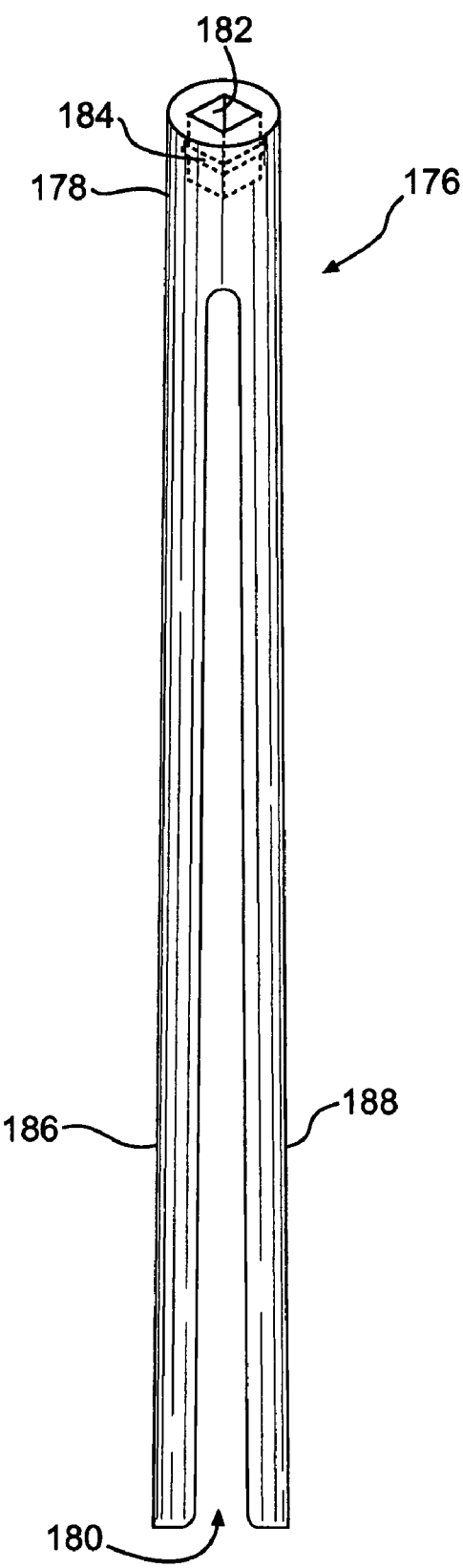
FIG. 13
FIG. 14

CARGO RESTRAINT TORQUE APPARATUS

RELATED PATENTS

This application relates to U.S. Pat. No. 6,089,802 entitled "Cargo Restraint System for a Transport Container" issued on Jul. 18, 2000, U.S. Pat. No. 6,227,779 entitled "Cargo Restraint Method for a Transport Container" issued on May 8, 2001, and U.S. Pat. No. 6,607,337 entitled "Cargo Restraint System" issued on Aug. 19, 2003, all of common inventorship and assignment as the subject application.

BACKGROUND OF THE INVENTION

This invention relates to an improved torque apparatus operable for use to tension flexible bands to secure freight or restrain cargo during transport. More particularly, this invention relates to a novel torque tool apparatus used for securing and restraining undesired movement of drums, boxes, rigid and flexible containers, palletized or not palletized, within the interior of a truck body, a railroad car, an intermodal container, and the like.

In the United States most overland shipping is accomplished using either a tractor/trailer truck combination, often referred to descriptively as an eighteen wheeler, or via railroad boxcars and/or truck trailers mounted on flatcars. Truck trailers are typically forty five, forty eight or fifty three feet in length and are often loaded with cargo in containment enclosures such as fifty five gallon closed head drums, super sacks or plastic reinforced bags, plastic wrapped bundles, cased goods, metal coils, specialty heavy paper rolls, plastic or metal containers mounted on pallets, and the like. Although each containment enclosures or bundles may be quite heavy and stationary at rest, the mass of a transport load can produce considerable momentum force as a truck or rail car is placed in motion.

Rail cars may be made up by a coupling or humping process within a switching yard. When a railroad car is rolled into a stationary string of cars, the impact causes the car couplings to lock together with a jolt. This impact can apply a significant force to cargo within the rail car. Moreover, during transport, railway cars are subject to braking forces, run-in and run-out coupler impact over grades, rail vibration, dips in the track, and swaying. In a similar manner trucks are subject to stopping and starting forces, emergency braking, bumps and swaying from uneven road beds, centrifugal forces on curves, vibration, etc. which tend to shift loads.

In addition to the above discussed overland shipping, most shipments for export, both in the United States and abroad, are placed into intermodal containers. These containers have standardized dimensions of twenty or forty feet in length and are fabricated with steel, corrugated sidewalls which are structurally self-supporting and rugged. Several intermodal containers may be stacked on top of each other for transport by sea, rail, or road. Within the containers, drums, boxes, etc. hold actual product as noted above.

The cargo of these intermodal containers experience various forces throughout the course of movement, as noted above in connection with overland transport, such as, acceleration, centrifugal loads, braking, vibration, etc. In addition, intermodal containers, when loaded onto ships for ocean passage, are subjected to wave forces including: yaw, pitch, heave, sway, and surge. Each of these forces has the potential to impart a substantial force onto the contents within an intermodal container. In this, when a container changes direction or speed, cargo within the container tends to continue along the previously existing path until it contacts an interior wall of the container. Without some type of restraint and/or cushioning system, the cargo builds up considerable momentum, independent of the container. The amount of momentum is equal to the mass of a load multiplied by its velocity. In the case of large cargo loads, even a small change in velocity or direction can generate substantial forces.

When cargo contacts the interior walls or doors of a container, the force necessary to reduce its momentum to zero must be absorbed by the goods and/or the container. Such forces can result in damage to the cargo, damage to the interior walls or doors of the container, damage to the cargo packing, and may create dangerous leaks if the cargo is a hazardous material. Accordingly, it is undesirable to permit cargo to gain any momentum independent of a container during transport. This is accomplished by restraining the cargo within the container so that the cargo and the container are essentially united and operationally function as one object during transport.

In order to secure a load during transport and minimize undesired shifting and damage the load containment enclosures are often secured to the floor and/or sides of the trailer or boxcar by specially fabricated wood framing, floor blocking, rubber mats, steel strapping, heavy air bags, etc. Each of these previously known systems for securement have limitations associated with construction cost, lack of strength sufficient to secure heavy loads, operator skill in securing cargo, etc. Moreover, although rear doors of a trailer may be relied on to at least partially secure non-hazardous materials such as food-stuffs, tissue or soft paper products, furniture, appliances, etc., for hazardous materials, and many other types of loads, the rear doors of a container may not be used to even partially secure a load. In fact, in order to comply with Department of Transportation Regulations and Bureau of Explosives, hazardous materials are not permitted to contact rear doors during an impact.

In the past, various dunnage materials have been utilized within trailers and/or intermodal containers to eliminate unwanted movement or shifting of a load during transport. The drums, boxes, or other containers have been restrained in several different ways. Primarily, cargo was stabilized by a method of load-locking and lumber bracing. This system involves strategically placing lumber between a load face and the rear doors of a container. This, however, can be a costly, time consuming, and generally inefficient means of securing a load. In this, the blocking process requires carpenters and is often outsourced to contractors. Moreover, wooden barriers can be time consuming to install. Still, further wood bracing can be somewhat brittle and subject to failure as a result of an abrupt impact.

In addition to the above, conventional methods of load-blocking with lumber bracing simply can not perform some tasks. For example, the most efficient means of filling an intermodal container is eighty, fifty-five gallon drums, double stacked in a twenty-foot long container. However, if eighty barrels are loaded there are only approximately four inches between the load face and rear doors of the container. Four inches is not enough space to put sufficient lumber to adequately brace a load of eighty drums. Consequently, when wood bracing is utilized as a system of restraint, shippers are forced to ship containers that are not filled to capacity. This reduces transport efficiency and increases transportation costs. Moreover, some types of wood, such as conifer woods, are not acceptable to cross international boundaries without certification of special fumigation or heat treatment processing. The International Plant Protection Convention ("IPPC") has issued "Guidelines for Regulating Wood Packaging Material in International Trade" having specific sections, requirements and limitations with respect to wood dunnage that has been accepted by numerous countries including the United States.

The Department of Transportation has established a standard to determine if a particular restraint system is capable of adequately securing hazardous cargo. In certain instances, conventional load-locking and lumber bracing has not received approval to ship hazardous cargo.

Still further in some instances a trailer or boxcar may be used for shipping where only a partial load is carried. Moreover, a partial load might be positioned within a central location of the trailer. In this instance it may be impractical to construct wooden front and rear dunnage sufficient to secure a load where the front of the trailer is not utilized.

Other known means of restraint such as ropes, metal or plastic straps or stands and the like appearing in the past have tended to exhibit impaired performance and are often not functionally suitable to restrain loads under even moderate conditions. Consequently, a need exists for securing lading in truck trailers, boxcars, and intermodal containers that is functionally effective, cost-efficient, labor-efficient, and able to comply with Department of Transportation and Bureau of Explosives regulations. Still further, a need exists for securement systems that cooperate with enhanced strength characteristics of flexible load restraining strips, such as identified in the patents noted above and applications for patent below, and limit cargo travel within a container.

More specifically, at least one method and apparatus for restraining cargo movement which overcomes some of the foregoing limitations is disclosed in U.S. Pat. No. 4,264,251, of common assignment with the subject application. The invention disclosed in that patent comprises sealing strips that are adhered to mirror image opposing sidewalls of a container and a joining mechanism that binds the ends of the strips together into a secure and taut restraint.

In the '251 patent, flexible securement strips are applied in a manner similar to hanging wallpaper, where an adhesive is applied onto a surface within a trailer. Then a retaining strip is applied to the adhesive. In addition to this requirement of a separate adhesive, systems appearing in the past sometimes encountered problems associated with weakness at the joints. At the juncture where the strips came together, an opportunity existed for slippage of the joined panels. Moreover, intermodal containers have corrugated walls as noted above. These corrugations make applying a restraining strip to a separate adhesive, which may not have an even application, substantially more difficult.

In addition to the restraining system disclosed in U.S. Pat. No. 4,264,251 other systems have been developed that provide enhanced operating characteristics and advantages, as discussed in the above identified U.S. Pat. Nos. 6,089, 802; 6,227,779 and 6,607,337. The disclosures of these prior four patents, of common assignment as the subject application, are hereby incorporated by reference as though set forth at length.

Further to these prior systems of securing lading in truck trailers, railroad cars, and intermodal containers increasing attention has been placed on securing heavier and denser loads, including hazardous materials, without abandoning the advantages achieved by previously known commercial systems. Moreover, there is interest in decreasing the elastic and/or plastic elongation and enhancing the vertical securement function so that hazardous materials can be transported with enhanced efficiency and security. In this regard it would be desirable to utilize an eighty, fifty five gallon, drum load within a conventional intermodal container. In this arrangement four steel drums need to be positioned next adjacent to the rear door of an intermodal container. In the past, issues have existed with respect to unacceptable travel of loads which may even come into contact with rear doors of the container during impact. As noted above, for hazardous loads, load contact with the rear doors is not acceptable by HazMat regulations.

In addition to the above, other restraining systems known in the past required multiple elements which were cumbersome to store, were arduous to install, and often required a degree of skilled labor. Systems using straps, nails, anchors, or bolts all require substantial storage space even when not in use. Furthermore, such systems increase the safety risk to the workers restraining the cargo. Still further such systems have often been unable to satisfy safety and travel limits imposed by regulatory bodies in various countries.

In addition to the above concerns, systems and procedures used in the past relying on accessories located within the cargo container often were not able to secure a partial load. That is, if the load does not extend to the front or rear of the container, such as a centrally located load, the necessary anchors may not be available in an area where they can be effectively used.

The foregoing limitations in cargo and freight restraint have been addressed by the applicant here through the invention of certain flexible strip or bands of reinforced or monolithic materials that have been disclosed in the following four of applicant's applications for patent filed on Dec. 9, 2003: Ser. No. 10/730,024 "Laminated Cargo Restraint System and Method" which issues as U.S. Pat. No. 6,923, 609 on Aug. 2, 2005, Ser. No. 10/730,025 "Monolithic Cargo Restraint System and Method" which issued as U.S. Pat. No. 6,896,459, currently pending Ser. No. 10/730,042 "Cross-Weave Cargo Restraint System and Method," and currently pending Ser. No. 10/730,040 "Cargo Restraint System and Method." The disclosures of these applications are hereby incorporated by reference as though set forth at length. These stronger and less elastic flexible restraining strips provide enhanced tension systems that will require more uniform tension and higher tension in order to fully utilize the advances provided by these flexible restraining strips.

In each of applicant's foregoing identified applications opposing flexible strips are releasably self-adhered to an interior surface of a transport container such as a box car, truck trailer or intermodal container. The container is then loaded with cargo or freight and the opposing strips are wrapped across a load face and overlapped. At the overlap junction a rod with a central kerf is inserted over the overlapped ends and then a pair of wrenches are applied to one end of the close pin rod and the rod is twisted to tension the flexible strips around the load. A self-adhering patch is then placed across the junction to secure the twisted ends of the flexible strips together and the rod is withdrawn.

Securement implements of this type exhibit certain limitations. In this, handling the ends of two, overlapped, flexible strips which are usually fifteen inches wide along with a torque rod and two wrenches can be somewhat challenging for an installer. In addition to being cumbersome because of the number of pieces need to be managed the devices that are rugged enough to apply significant tension to the restraining strips are often heavy or bulky to manage. In addition, the torque rod often tends to skew or twist which may create an uneven tension across the securement strip. It will be appreciated that if the tension imparted to the top of a flexible strip is greater than the tension at the bottom of the strip an intended uniform restraining force across the entire fifteen inch strip is compromised.

The problems suggested in the preceding are not intended to be exhaustive but rather are among many which may tend to reduce the effectiveness of cargo restraining systems known in the past. Other noteworthy problems may also exist; however, those presented above should be sufficient to demonstrate that cargo-restraining torque systems appearing in the past will admit to worthwhile improvement.

OBJECTS AND SUMMARY OF THE INVENTION

Objects

It is a general object that the subject invention provide a novel system and torque apparatus to secure a load within a truck trailer, boxcar, intermodal container, or the like, which will obviate or minimize problems of the type previously described.

It is another general object of the subject invention to judiciously protect cargo from damage during transport and to provide enhanced and more uniform vertical, as well as lateral, securement of a load within a container.

It is a specific object of the invention to provide a securement system and torque apparatus for a flexible restraint system for a tractor trailer, boxcar, intermodal container, and the like, which is operable to facilely and relatively quickly tension flexible load restraining bands or strips about a freight load.

It is a related object of the invention to provide a securement system and torque apparatus for a tractor trailer, boxcar, intermodal container, and the like with enhanced securement, where the amount of load travel for a given level of impact is minimized.

It is a specific object of the invention to provide a torque apparatus for a securement system that is relatively easy to handle and operate by even inexperienced installers.

It is yet another specific object of the subject invention to provide a torque apparatus that provides enhanced tension across a vertical extent of a securement flexible strip.

It is another particular object of the subject invention to provide a torque apparatus that is easier to manipulate and handle than previously known torque systems and may be facilely withdrawn from engagement with load restraining strips.

It is another object of the subject invention to provide a unique torque apparatus that exhibits reduced tendency to twist during use in securing high tension load systems.

BRIEF SUMMARY OF THE INVENTION

One preferred embodiment of the invention, which is intended to accomplish at least some of the foregoing objects, comprises a torque apparatus that includes a rod having a generally U-shaped configuration and a ratchet arm mounted on a closed end of the rod. A restraining arm is also operably connected to the closed end of the rod and serves to operably manipulate the torque rod and provide a reaction member during a tightening process.

In one embodiment the torque rod has tines that are splayed outwardly from the byte of the rod to distal tips. This spreading of the tips operably decreases a tendency of the tines of the rod to twist longitudinally as loading is applied to the torque apparatus. In addition the surfaces and edges of the tines are curved and smooth to facilitate removal of the torque tool from a tightly wound securement system. Still further, in this connection, the tines of the torque tool may be coated with a low friction composition such as polytetrafluroethylene to further facilitate removal of the tool from a tensioned securement system.

THE DRAWINGS

Other objects and advantages of the present invention will become apparent from the following detailed description of preferred embodiments taken in conjunction with the accompanying drawings wherein.

Figure 8:
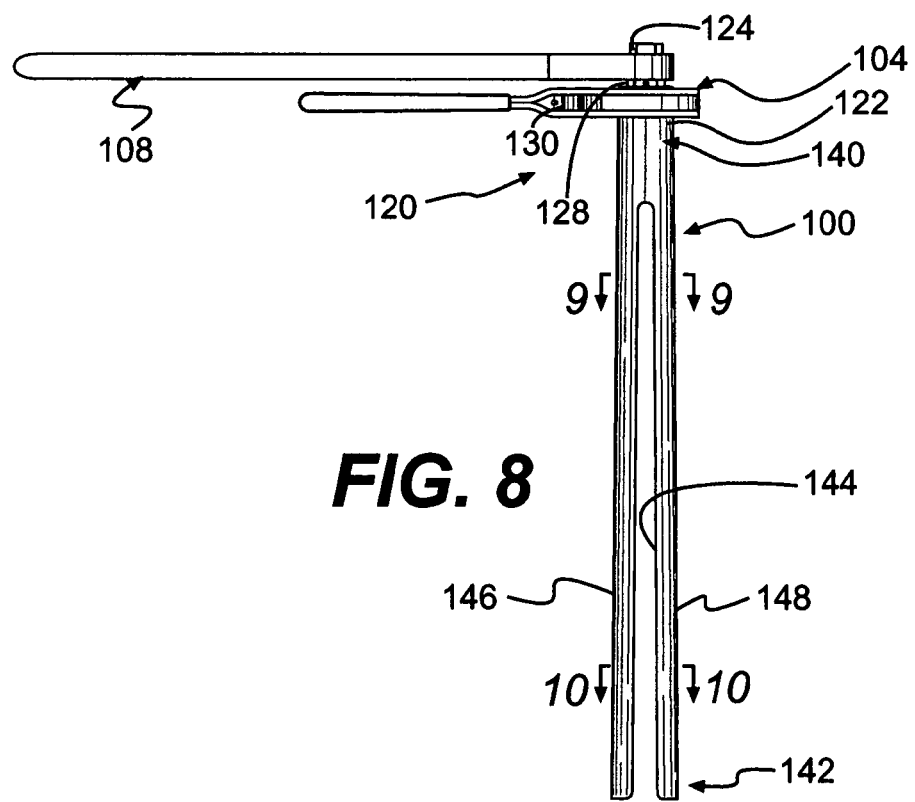
Figure 9:
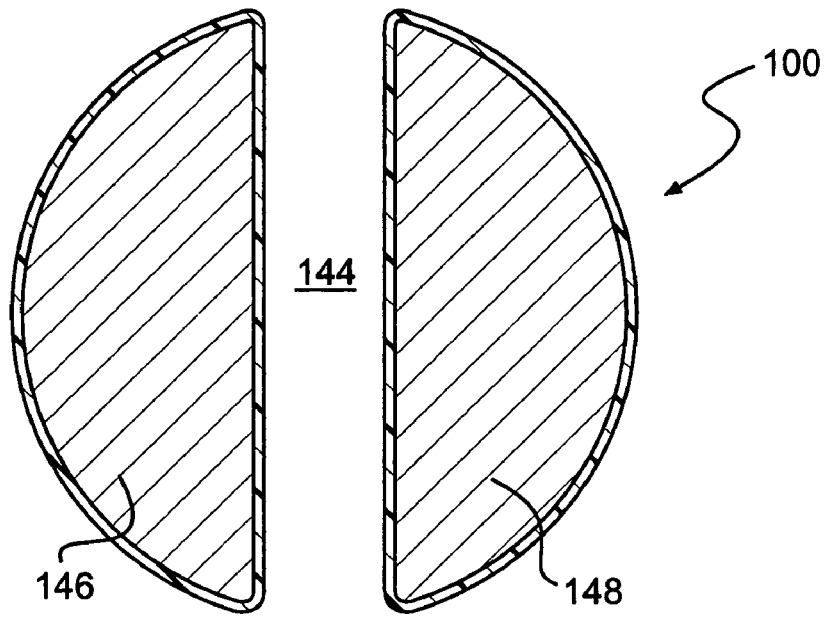
Figure 10:
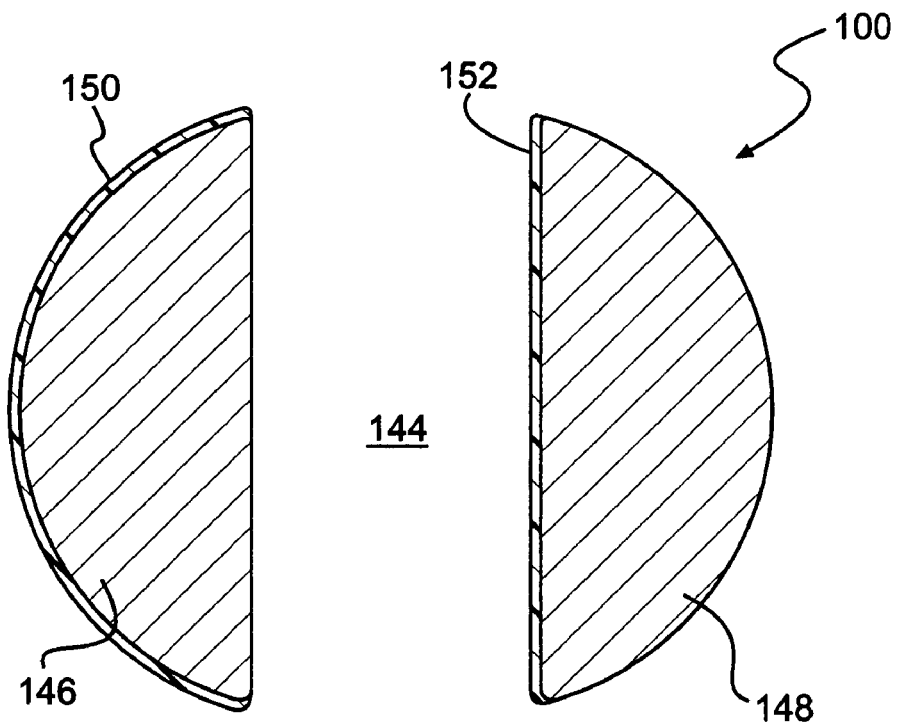
Figure 11:
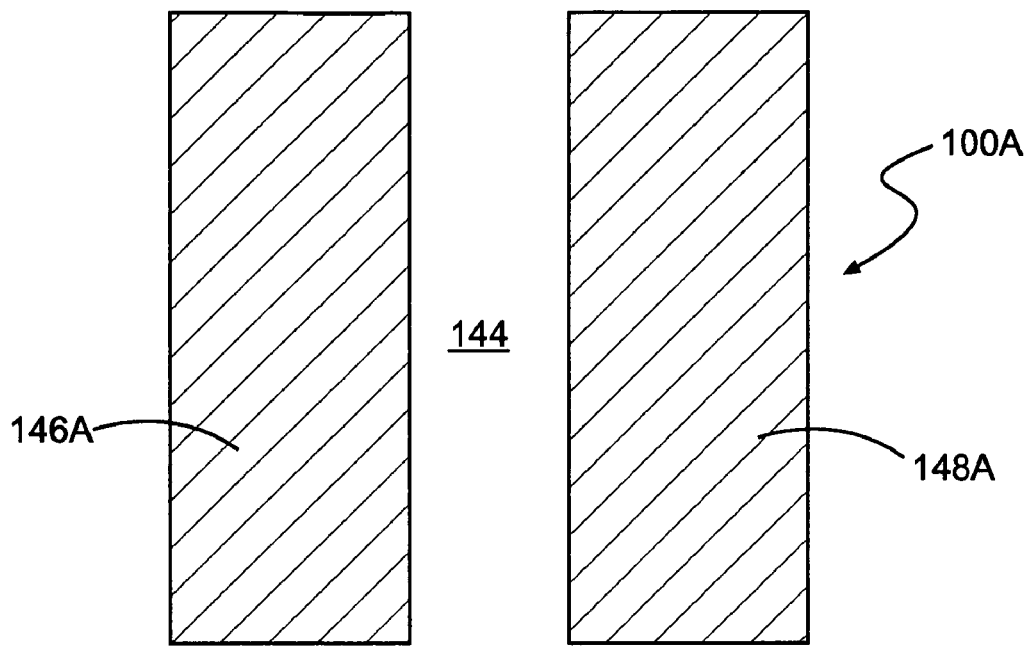
Figure 12:
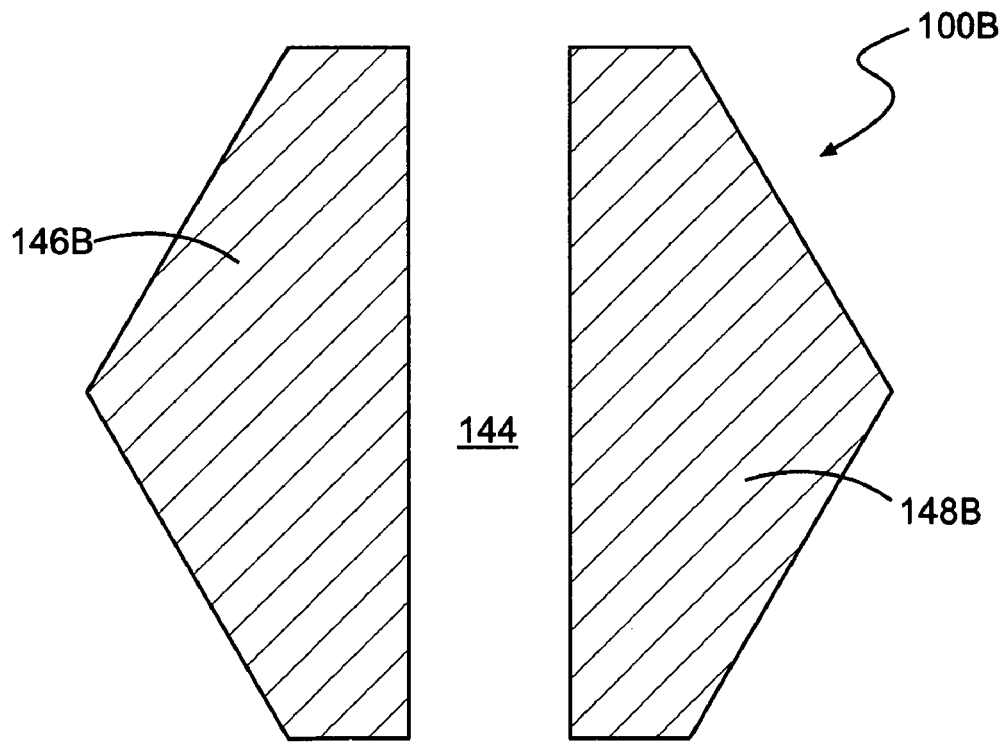

FIGS. 7 (A through D) disclose a sequence of views showing use of the subject torque apparatus for tensioning and securing the free ends of opposing flexible load restraining strips across the face of a freight load;

FIG. 8 is a side view of a torque apparatus in accordance with a preferred embodiment of the invention;

FIG. 9 is a cross-sectional view of the tines of the torque tool disclosed in FIG. 8 as taken along section line 9—9 in FIG. 8 but with an optional coating of the tines;

FIG. 10 is a cross-sectional view, similar to FIG. 9, but taken along section line 10—10 in FIG. 8 and disclosed the splayed nature of the tines from the byte to the distal tips of the torque tool;

FIG. 11 is a cross-sectional view similar to FIG. 9, however, disclosing an alternative generally square exterior configuration of opposing generally rectangular torque tines;

FIG. 12 is a cross-sectional view similar to FIG. 11 disclosing another alternative hexagonal exterior configuration of a pair of opposing torque tines;

FIG. 13 is an illustration of an alternate preferred form of the invention comprising a torque rod having tensioning tines that gradually separate outward from a closed or proximal portion of the torque rod to a distal end of the rod with a hex sided head to receive a conventional ratchet torque wrench; and FIG. 14 is an illustration of a variation of the embodiment disclosed in FIG. 11 where a head portion of a torque rod has a square recess for receiving a mating drive element of a conventional torque wrench.

DETAILED DESCRIPTION

Context of the Invention

Figure 1:
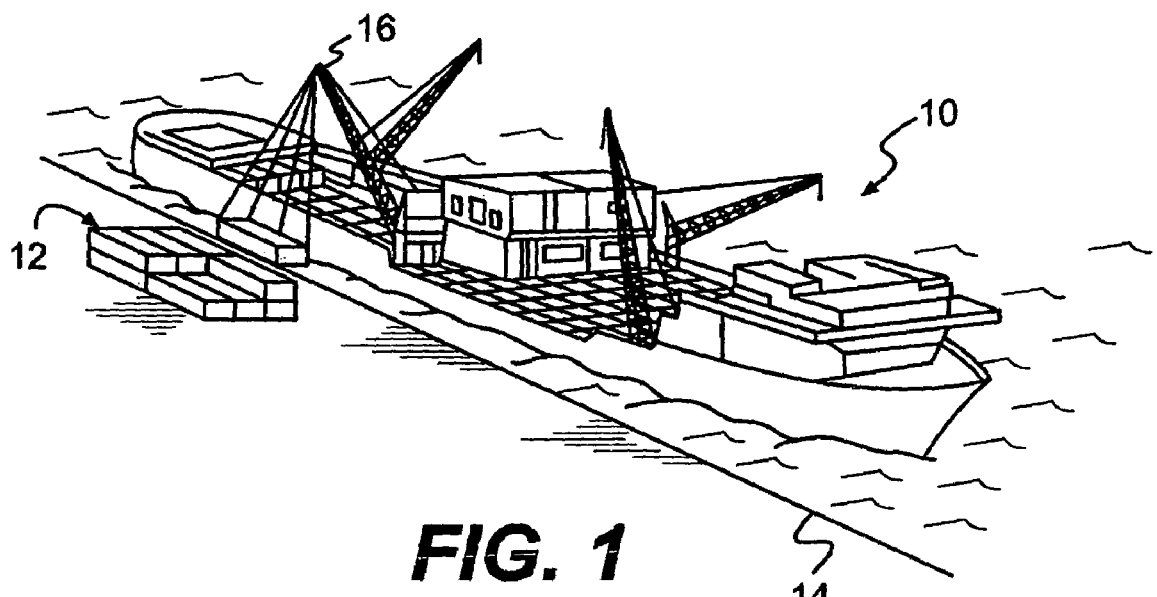
FIG. 1 is an aerial view of a ship at a dock with cranes lifting and loading intermodal containers onto the ocean going vessel.

Referring now particularly to FIG. 1, there is shown one operative context of the subject invention. In this, a ship 10 is shown docked at a port and intermodal containers 12 are being loaded onto the ship. Specifically, FIG. 1 depicts the ship 10 at a dock 14 and cranes 16 are lifting and loading the intermodal containers 12 to be loaded onto the ocean going vessel 10. The subject invention may be advantageously used to secure cargo within the intermodal containers 12, like the ones being loaded onto the ship 10.

Figure 2:
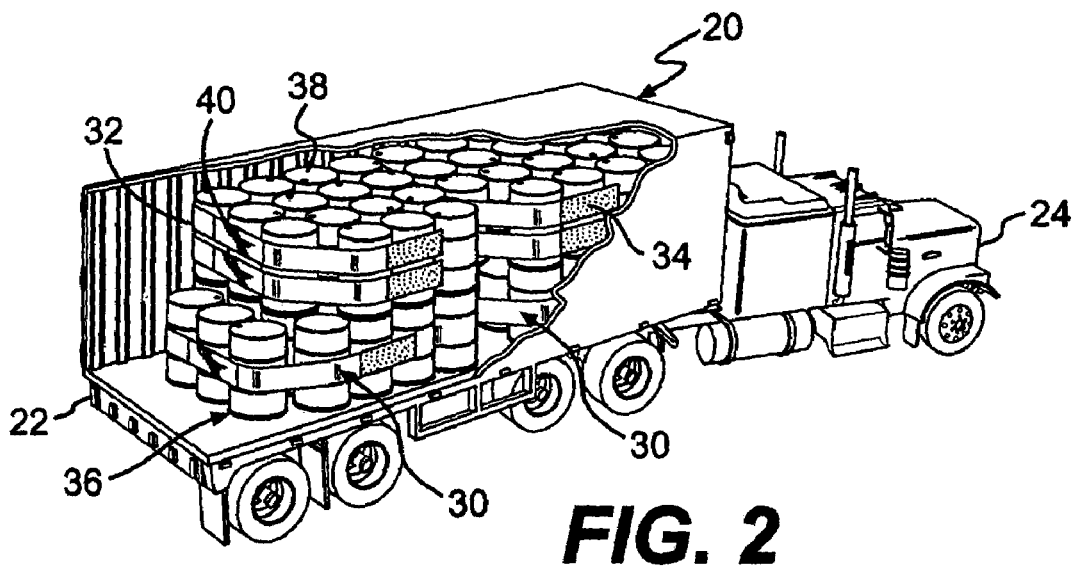
FIG. 2 is an axonometric view showing the interior of a truck trailer, or an intermodal container secured to a flatbed truck, with a partial load secured within the container.

FIG. 2 is an axonometric view, partially broken away to disclose interior detail, that discloses the invention in another illustrative operating environment. In this view an intermodal or cargo container 20 is shown mounted upon a trailer 22 which is operably towed by a tractor 24 for land transport. Containers such as these are also operable to be mounted on railway flat cars either directly or attached to trailers 22. Other environments in which the subject invention is equally suitable for use includes railroad boxcars, and the like, not shown.

A partially cut away portion of FIG. 2 depicts a cargo restraining strip 30 which is operable to be self-adhered to an interior wall surface 32 of the cargo container 20. The cargo securement system comprises a pair of opposing restraining strips 30 adhered to the side walls of the container 20 by the use of adhesive segments 34 that self adhere to opposing portions of the container side walls. The restraining strips 30 then extend to be wrapped across the face of cargo 36, such as fifty five gallon drums 38. The restraining strips 30 overlap and are folded and drawn tightly together by an apparatus for tensioning in accordance with the subject invention to be discussed in detail below. Then an independent, self-adhering, overlying patch segment 40 is applied to the junction to unite the opposing restraining strips 30 from the container side walls across the cargo to secure the cargo to the interior wall surfaces of the container 20.

Figure 3:
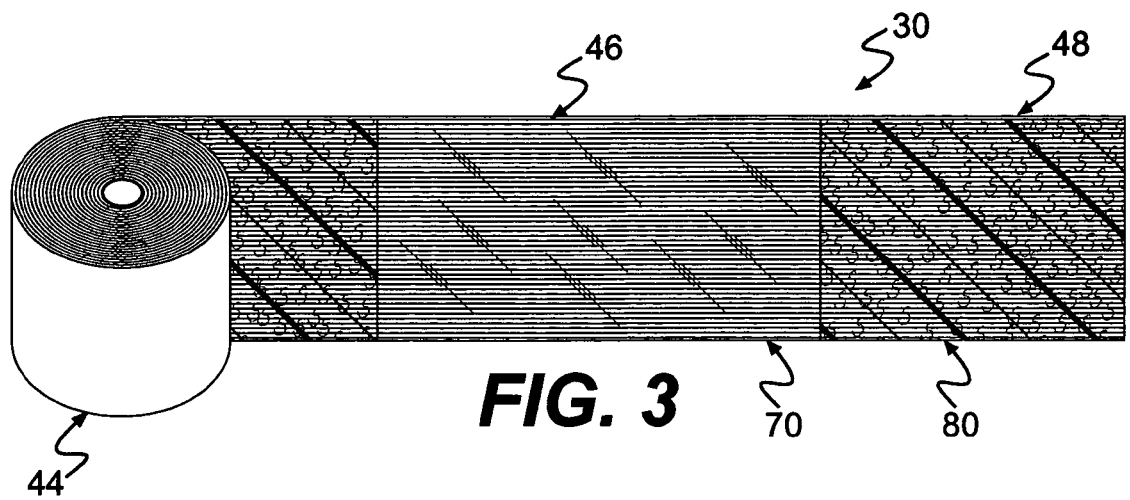
FIG. 3 is a pictorial view of a dispensing roll and a typical length of a securement restraining strip of enhanced strength, reduced elongation and vertical securement under impact loading for use with the subject invention.

Turning now to FIG. 3, the restraining strips 30, as previously illustrated in FIG. 2, are preferably manufactured and transported on reels or rolls 44. A roll 44 of strips 30 are manufactured in an end-to-end continuous fashion in lengths of approximately twelve feet composed, in one preferred embodiment, with a cross-weave reinforced construction. An initial, approximately seven foot segment is composed of the basic construction of the cross-weave restraining strip 46, which will be discussed in detail below, and alternate five foot segments 48 includes an extra self-adhering adhesive coating component. The strips 30 may be transversely perforated, at approximately twelve foot lengths, so that a strip 30 can be torn off or in any event can be facially cut to create a single approximately twelve foot length of restraining strip 30 for use on a job site. The restraining strips 30 are preferably fifteen inches in width; however, other widths may be substituted depending on the need for additional strength, which a wider strip is suitable to provide.

Figure 4:
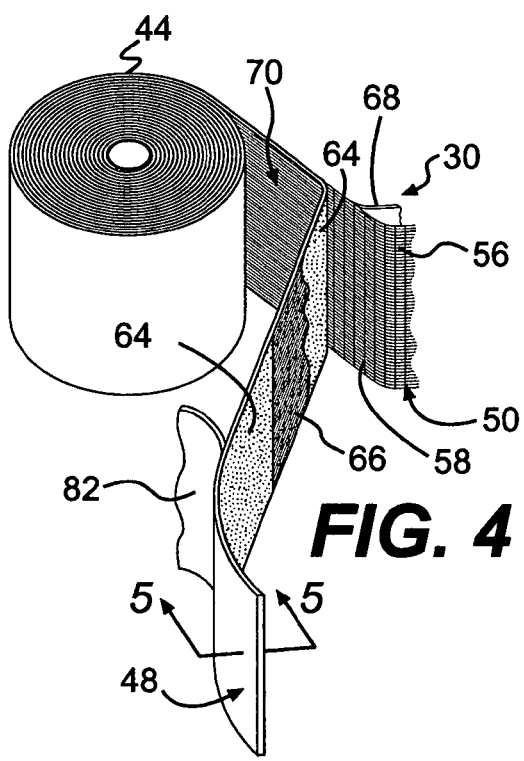
FIG. 4 is an axonometric view of one preferred embodiment of a securement strip as disclosed in FIG. 3 which has been partially redacted and broken away to disclose interior detail of the strip.
Figure 5:
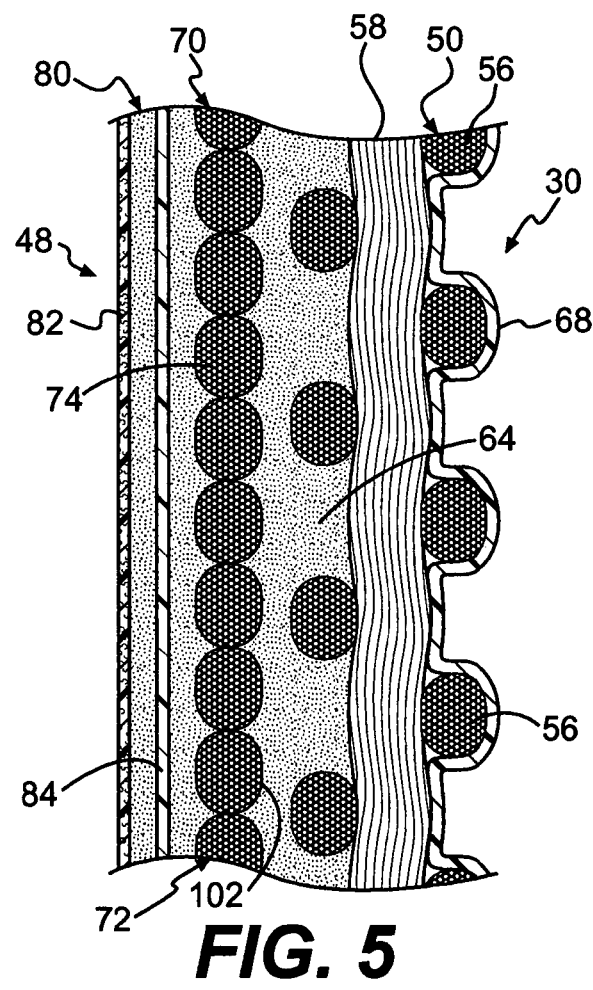
FIG. 5 depicts a partial, broken away view of a section of a flexible securement strip that may be used with the subject invention.

FIGS. 4 and 5 disclose detailed views of one preferred embodiment of the restraining strip 30 to be used in association with the subject apparatus for tensioning invention. FIG. 4 shows an expanded, partially redacted, view to disclose the relative position of components of the restraining strip 30. The restraining strip 30 includes a first cross-weave layer of reinforcement material 50. The cross-weave layer 50 is preferably composed with a plurality of substantially parallel longitudinal strands 56 extending along the length of the restraining strip 30, note again FIG. 3, and crossing strands 58. As shown particularly in FIG. 5 the crossing strands 58 are woven into the longitudinal strands 56 and have a next adjacent spacing that is approximately twice the spacing of the parallel longitudinal strands 56.

The cross-weave restraining strip 30 includes a first adhesive layer 64 having a first surface or side and a second surface or side. The first surface of the first adhesive layer 64 overlays and bonds to an interior surface of the cross-weave layer 50.

Although a substrate may not be needed for the first adhesive layer 64, in the event a substrate is necessary or desirable a central substrate sheet 66 may be used. The substrate may be composed of an acrylic sheet having a plurality of transverse holes, a resin differential polymer with holes to render the substrate porous, or VALERON® which may be fashioned in the form of a screen foundation. Companies such as DuPont, Hoeschst Celanese, and others manufacture such materials. Alternatively, the substrate may not be porous provided that the shear strength of the adhesive materials is sufficient to carry axial loading as discussed below.

The first, cross-weave layer of reinforcement further includes an outer coating 68 which adheres to the cross-weave and is preferably a thin layer of MYLAR®, although other materials may be used. The coating provides dimensional rigidity to the cross-weave and a protective clear or opaque coating.

As noted above, the substrate 66 is preferably porous and divides the adhesive layer 64 into first and second adhesive layers which may operably penetrate through the substrate and self bond together. The adhesive layer 64 is composed of compositions that have a high shear strength, wide operative temperature gradient—including cold weather tackiness and a specific gravity of less than one to displace moisture from the side walls of a container through capillary action. Adhesives of the type that are preferred are available from the Venture Tape Company of Rockland, Mass.

In addition to the first, cross-weave layer of reinforcement material 50 the subject invention includes a second, reinforcement layer 70 which is composed with a plurality of parallel strands 72. As shown more particularly in FIG. 4 each of the strands 72 is composed of a plurality of finer denier strands 74 of reinforcing material. The reinforcement strands 74 may be composed of fine polyester fibers, polypropylene, fibers, and the like. KEVLAR® is a polyamide in which all the amide groups are separated by paraphenylene groups. KEVLAR® is a registered trademark of the DuPont Company of Wilmington, Del. Individual strand bundles 72 are directly abutted against and adhered to the second or outer surface of the first adhesive layer 64 as shown in FIG. 4.

In addition to the main body of the load restraining strip 30, which is continuous throughout the strip and comprises a cross-weave layer of reinforcement 50, a first adhesive layer 64, a second reinforcement layer 70 composed with parallel strands 72, as discussed above, in order to facilely adhere the flexible reinforced securement strip 30 to an interior surface of a container a length of an extra self-adhering adhesive material 48, note again FIG. 3, is applied in five foot segment lengths to an exterior surface of the reinforcement layer 70.

The self-adhering segment 48 is composed with a second layer of adhesive 80 which is applied in direct self-adhering contact with an outer surface of the second layer of reinforcement strands 70. The second layer of adhesive material 80 has an outer side and a release paper 82 extends over the outer most surface of the second layer of adhesive 80. The release paper 82 enables individual segments of the subject load restraining strip 30 to be manufactured on a reel core as shown in FIGS. 3 and 4 and the release paper 82 is peeled off of the load restraining strip 30, on site, so that the second layer of adhesive 80 may be used by an installer to affix one end of the load restraining strip 30 to a side wall, or other attachment surface, of a transport container.

The second layer of adhesive 80 may be composed with a core or substrate member 84. The substrate may be a MYLAR® material or a porous material to enable the adhesive layers of the second adhesive component to bond together.

System of Installation

Turning now to FIGS. 6 through 10 an apparatus is disclosed for tensioning flexible restraining strips 30 such as discussed above. Also disclosed is a torque rod for use in the tensioning system for tensioning flexible restraining strips across cargo within a container. Although the subject invention has particular utility in tensioning bands or strips for securing cargo within either twenty or forty foot intermodal containers, such as illustrated, but other carrier systems such as boxcars, truck trailers, and the like, also advantageously can use the subject invention. In fact, various embodiments of the invention are adaptable to containers of all sizes.

Figure 6:
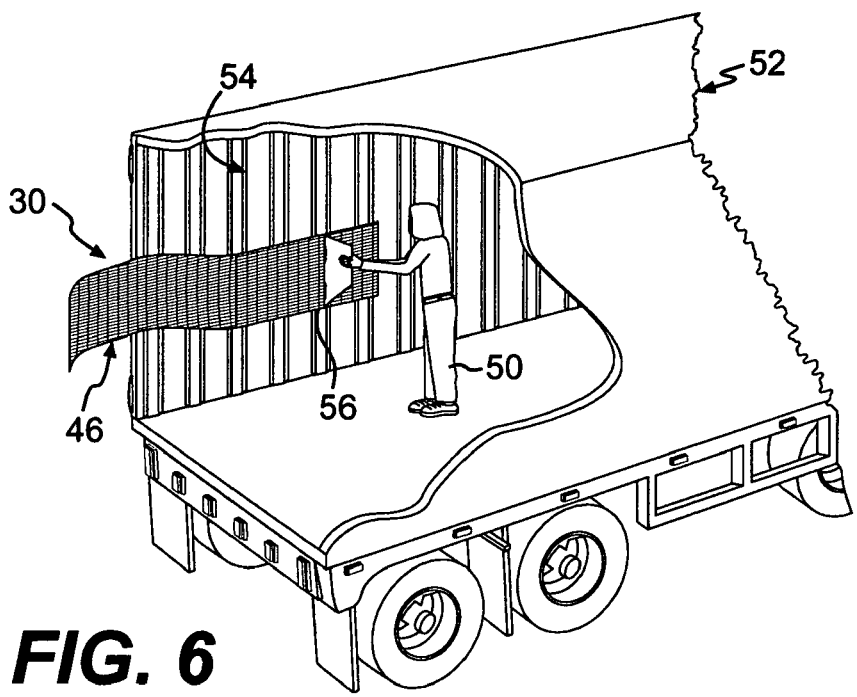
FIG. 6 is an axonometric, partially broken away view of an installer inside an intermodal container or truck trailer applying a flexible restraining strip on one wall surface of the container before cargo is loaded into the container.
Figure 7A:
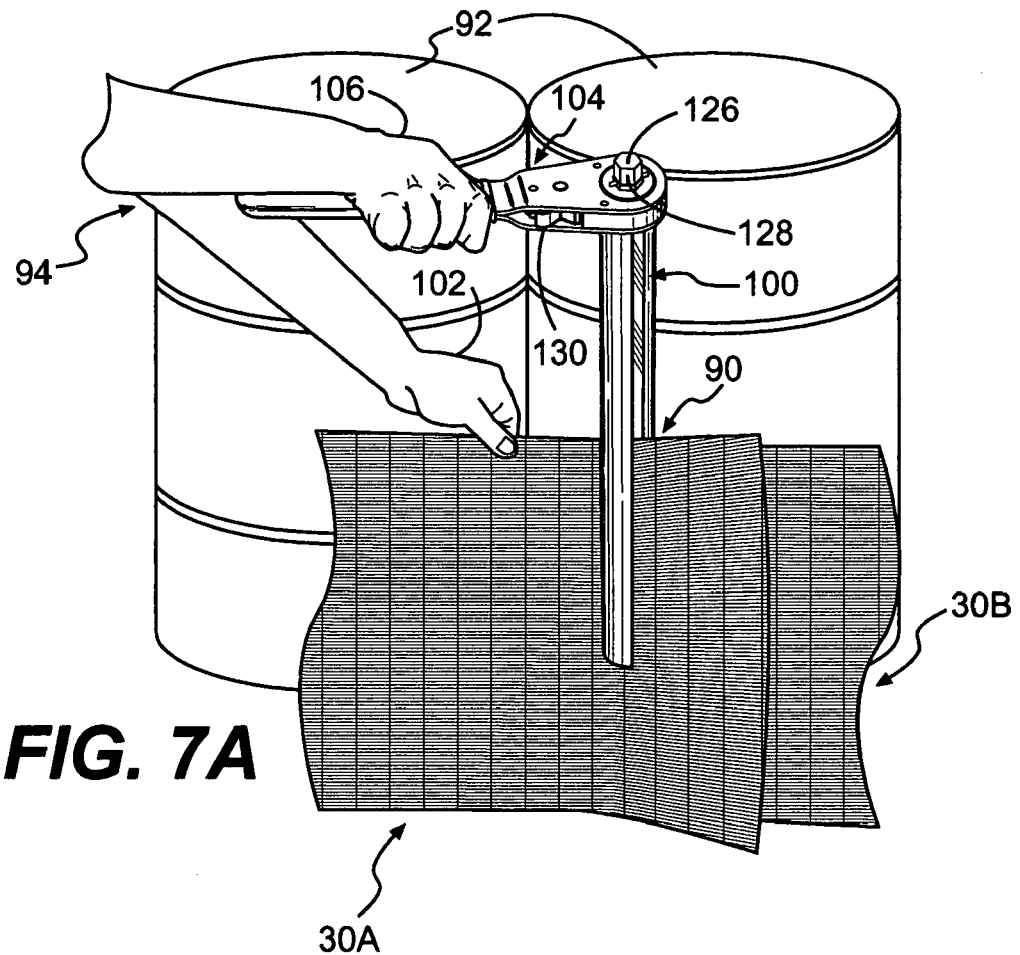

Turning now specifically to FIGS. 7A through 7D an operative environment of the subject invention is specifically shown. In this, as shown in FIG. 7A the free ends 30A and 30B of flexible load restraining strips 30, which have been previously adhered to opposing sidewall surfaces of a container or truck body, note again FIG. 6, are drawn together by an operator 94 and the free ends of the flexible load restraining strips are overlapped by hand.

The overlapped portion is at a central location 90 behind the face of a load, such as barrels 92. As more particularly described in applicant's previously noted U.S. Pat. Nos. 6,089,802 and 6,227,779 an improved load restraining strip 30, also as described above, is one component of a load restraining system as described more fully in these patents. Briefly, however, and as illustrated in connection with FIGS. 2 and 3, a pair of load restraining strips 30 are cut from a roll 44. A release paper 82 is removed from strip segment 48 and the strip 30 is applied to one side wall, or other interior surface, of a container 20, such as illustrated in FIGS. 2 and 6. A second load restraining strip 30 is also applied to a directly opposing, mirror image, surface of the container. The free ends 30A and 30B of the opposing pair of load restraining strips 30 are overlapped as shown in FIG. 7A. A torque rod 100, in accordance with one aspect of the invention, is then slid over the overlapped ends 30A and 30B by an operator while holding the free ends 30A and 30B together with a free hand 102.

In a preferred embodiment a toggle action, double throw, ratchet mechanism 104, having a relatively short handle, is mounted on a proximal or closed end of the torque rod 100 and an operator can use his other hand 106 to place the torque rod 100 squarely across the overlapped free ends of the flexible strips 30 as shown.

Figure 7B:
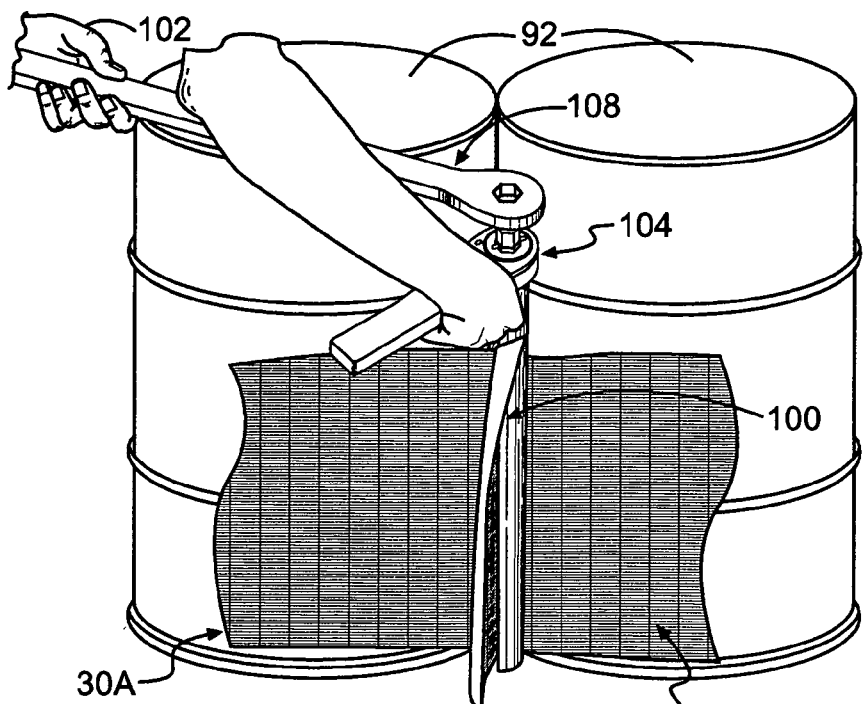
Figure 7C:
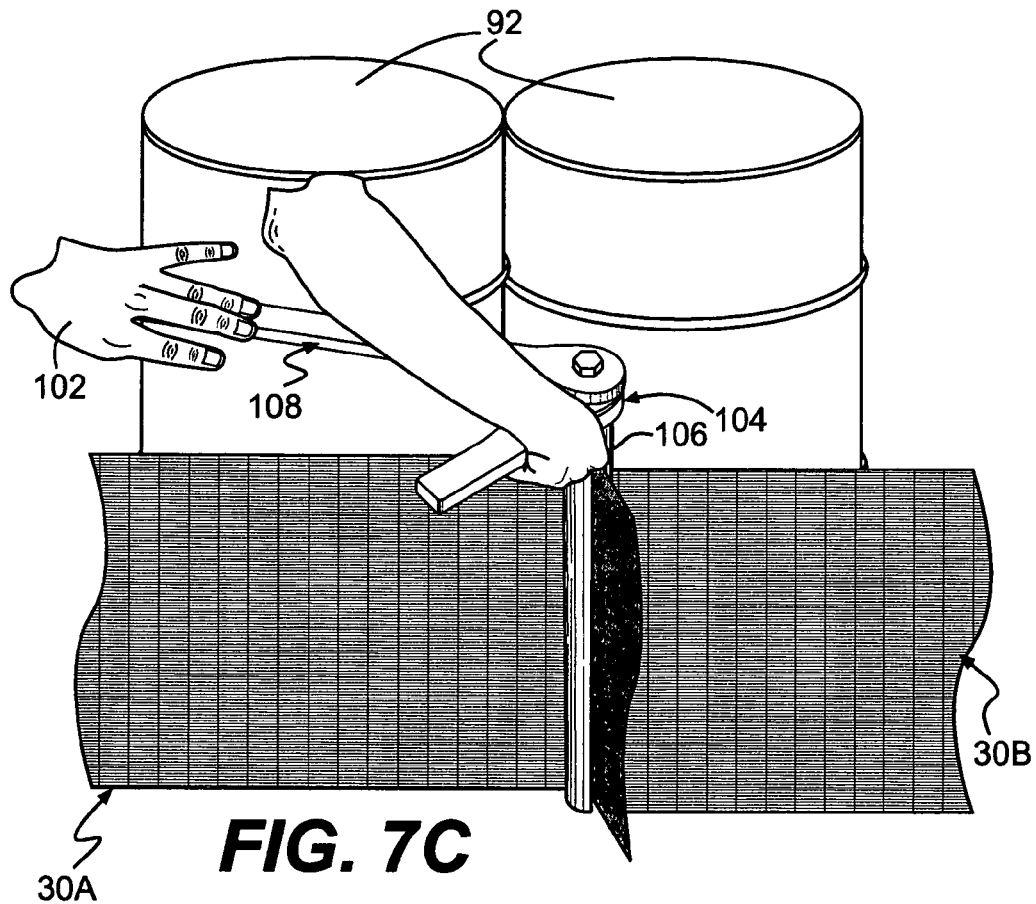

A long alignment and reaction arm 108 is then added to the top of the torque rod 100, as shown in FIG. 7B, and held against an outer surface of the load, as shown in FIG. 7C. This long arm member 108 enables an operator to maintain the torque rod 100 is a square transverse posture and concomitantly provide a secure stationary torque reaction member for the ratchet mechanism 104.

An operator then selects the setting on the toggle and rotates the ratchet wrench 104 in either direction that is suitable for the way in which the strips are overlapped in order to wind the free ends 30A and 30B about the torque tool 100 to tension the flexible strips 30 about the face of the load.

Figure 7D:
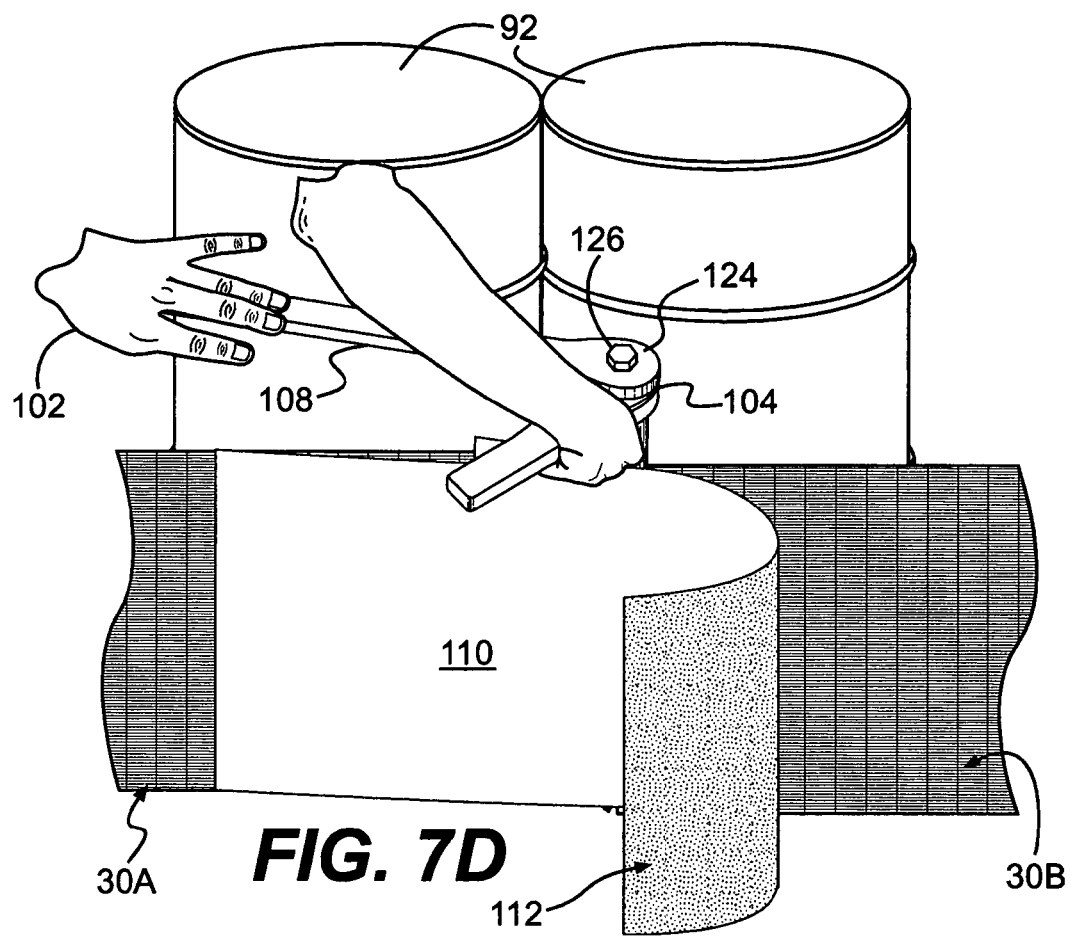

Once the strips 30 are properly tensioned, as shown in FIG. 7D, a separate self-adhering patch 110 is applied across the twisted free ends 30A and 30B of the flexible strips 30. The patch 110 is typically five feet or so in length and is a reinforced flexible strip similar in design to the flexible strips 30, however, the patch 110 includes an adhesive layer 112 that extends completely across one surface of the patch 110. The adhesive layer enables the patch to operably engage, in a self adhering contact, across the ends of the restraining strips 30 to secure the strips together in tension. Following application of the binding patch 110 the operator pulls the torque rod 100 out of engagement with the flexible strips for reuse.

Torque Rod and Torque Tool

Having described a system of operation for securing a cargo load with flexible strips 30, a torque tool 120, according to a preferred embodiment of the invention, is specifically disclosed in FIG. 8.

The torque tool 120 is composed of a torque rod element 100, a ratchet arm mechanism 104 mounted upon a closed or proximal end 122 of the torque rod 100 and a torque reaction and alignment arm 108.

The torque reaction arm 108 has an internal hex head bore 124 that is operable to be releasably secured to a free end 126, note FIG. 7A, of a short rod 128 journaled within an axial bore within the proximal end of the torque rod 100. A detent releasably secures the torque reaction and alignment arm 108 to the short rod 128 such that an operator may selectively apply or remove the torque reaction arm 108 from the proximal end of the torque rod 100. This releasable attachment capacity allows an operator to connect the torque reaction arm 108 to the torque rod 100 and then manipulate and hold the torque rod 100 in a transverse position with respect to the flexible strips 30A and 30B with one hand 102 as partially shown in FIG. 7C.

An operator then holding the torque rod 100 secure and transverse to the strips 30A and 30B with the long arm 108, ratchets the torque rod 100 in a desired direction using the ratchet mechanism 104 mounted upon, or integrated with, the proximal end of the torque rod 100. The ratchet mechanism is of a conventional design but includes a toggle 130 to operably switch the ratchet drive direction so that an operator is free to ratchet the torque rod 100 in either a clockwise or counter-clockwise direction, as desired, while the long handle 108 supports the torque rod 100 is a secure vertical orientation as the torque rod 100 rotates about the short rod 128 which is held stationary by arm 108.

Once the flexible strips 30 are twisted together, as noted above, an overlaying patch 110 is operably adhered to the junction, as illustrated in FIG. 7D, and the torque rod 100 is withdrawn vertically, and thus transverse to the junction location, by lifting on the ratchet element 104 and/or torque reaction and alignment arm 108 handles.

The torque rod 100 is configured to have a first proximal end 140 and a second, open, or distal end 142. A longitudinal channel or kerf 144 is fashioned or cut essentially throughout the length of the rod 100 to divide the rod into mirror image first 146 and second 148 tines or arms. Each tine 146 and 148, as shown in FIGS. 9 and 10, is essentially a semicircle in cross-section. The edges of the tines are rounded to facilitate application and more importantly removal of the torque rod 100 from a tensioned pair of flexible sheet ends 30A and 30B.

The torque rod 100 is fabricated from a high strength and relative light material. In a preferred embodiment the rod is composed of titanium. In another embodiment the rod is fabricated from a titanium and vanadium alloy. Although these materials are presently preferred, based on strength and weight, other titanium alloys and/or light weight and high strength materials are contemplated by the subject invention.

As stated above, the tines of the torque rod 100 may be fabricated with smooth surfaces and rounded edges to facilitate deployment and removal of the rod from tightly wound ends of the flexible strips 30A and 30B. Moreover the tines of the rod may be enrobed with a low friction surface coating of polytetrafluroethylene, or Teflon, or other low friction coating materials such as illustrated in FIG. 9. Teflon is a registered trademark of the DuPont Company of Wilmington, Del. Still further, and alternatively, only the outer surface 150 or only an inner surface 152 may be coated with polytetrafluroethylene, or other low friction material, as necessary or desirable to meet the requirements of the surface coefficient of friction of the flexible sheets 30. (Note the alternative coated surfaces are depicted in FIG. 10.) This low friction coating enables the tines 146 and 148 to be facilely applied and withdrawn from the free ends 30A and 30B of the flexible sheets after they are tightly wound together and are under tension about the face of a load.

Importantly the kerf or channel 144 between the tines 146 and 148 has a width that progressively increases from the proximal or closed end 140 of the torque rod 100 to the distal or free end 142 of the rod. This increase in spacing between the tines can be seen by comparing the width of kerf spacing 144 near the closed or proximal end shown in FIG. 9 with FIG. 10 which shows the kerf spacing near the open or distal end 142 of the rod 100. The increase in spacing is linear and although the exact spacing can vary, in a presently preferred embodiment the spacing between the tines at the proximal end 140 is approximately 0.3 inches and the spacing at the distal end is about 0.4 inches. This gradual, linear increase in spacing prevents the distal ends of the tines from skewing as torque is applied to the rod 100 from the closed proximal end 140 with the ratchet mechanism 104. As the torque rod 100 is ratcheted by mechanism 104, as supported by reaction arm 108, the tines twist the free ends 30A and 30B of the flexible load restraining sheets together around the rod 100.

The shape of the torque rod 100 is generally cylindrical in exterior configuration, however, other external shapes are envisioned by the subject invention and range from being triangular in cross-section to square in cross-section to multi-sided such as hexagonal in cross-section to the presently preferred round cross-section which provides a smooth cylindrical exterior surface.

More specifically, FIG. 11 discloses a cross-sectional view of an alternative configuration of the first 146A and second 148A tines of a torque rod 100A. In this embodiment each of the tines individually is fashioned as a general rectangle, in cross-section, however, the exterior configuration of the pair of tines 146A and 148A is approximately square. Still further, FIG. 12 is a view similar to FIG. 11, however, in this embodiment the torque arm 100B is formed with a first 146B and a second 148B pair of mirror image tines that form, in combination, a torque rod 100B that is generally hexagonal in cross-section.

Referring now to FIG. 13 there is seen an alternative embodiment of a torque rod 160. In this embodiment the closed or proximal end 162 of the rod is fashioned with a hex head 164 that is operable to receive an open or a closed end wrench or a conventional socket, ratchet, wrench (all not shown). In this embodiment the torque rod 160 is tensioned by being rotated with conventional tools as opposed to the specialty tools disclosed above in reference to the preferred embodiment of the subject invention. However, in this simplified embodiment the torque rod 160 is still composed of light weight, high strength materials such as titanium or a titanium and vanadium alloy or a similar light weight high strength alloy. In addition the kerf or channel 166 between a first 168 and a second 170 pair of opposing mirror image tines gradually increases in width from the closed proximal end of the rod 160 to the open distal end of the rod 172. Still further the tines may be enrobed with polytetrafluroethylene, or the interior of the kerf is coated with polytetrafluroethylene or just the outside surface of the tines may be coated as discussed above. Still further the cross-sectional shape of the tines 168 and 170 may vary such as shown in FIGS. 9–12 and also as discussed above.

Turning now to FIG. 14 there is yet another embodiment of the invention where a torque rod 176 is shown having a closed or proximal end 178 and an open or distal end 180. The closed end 178, however, in this embodiment merely has a square bore 182 that is operable to receive the head of a conventional ratchet tool. In this, an interior surface of the bore is fashioned with a recess 184 to cooperatively engage with a detent on the end of a ratchet tool. In an alternatively embodiment other tool engaging surfaces could be used such as a hex recess to engage with a conventional Allen wrench or the like. The material of this embodiment is also composed of light weight high strength titanium or a titanium and vanadium alloy or another light weight high strength material. Finally, the tines 186 and 188 of this embodiment may be coated with a low friction surface coating such as Teflon or the like as discussed above and the cross-sectional shapes may vary as shown in FIGS. 9 through 12, also as discussed above.

Having described in detail preferred embodiments of the invention, it may be useful to briefly set forth some of the major advantages of the invention.

SUMMARY OF MAJOR ADVANTAGES OF THE INVENTION

This subject invention provides a unique apparatus torque system and torque rod to provide uniform tension across the width of overlapping strips of flexible reinforcing materials.

This invention also provides a system which is easily handled by an individual operator and is rugged in design.

The long handle, which may be releasable fixed to the end of the torque rod enables an operator to manipulate the torque rod during ratchet tightening of the flexible strips.

The toggle ratchet wrench permits tightening in either direction depending on operator preference and or the application of the torque rod.

The torque rod has a channel that increases in width from a proximal to a distal end and skewing of the ends of the rod tines is thereby minimized.

The torque rod also may be partially coated or enrobed with a low friction surface coating to facilitate removal of the torque rod from tightly wound ends of overlapping flexible strips.

The torque rod is preferably cylindrical by can also be fabricated with various flat sided configurations such as triangular, square, hexagonal and other shapes.

The torque rod is composed of titanium and or a titanium and vanadium alloy and is light weight while being extremely strong to facilitate handling and uniform tension across the face of a load.

In describing the invention, reference has been made to preferred embodiments. Those skilled in the art, however, and familiar with the disclosure of the subject invention, may recognize additions, deletions, substitutions, modifications and/or other changes which will fall within the purview of the invention as defined in the following claims.

What is claimed is:

1. An apparatus for tensioning flexible load restraining strips for use in securing cargo within a transport container, which cargo is subject to shifting forces during transport, said apparatus for tensioning comprising:
    a torque rod having a first proximal end and a second distal end with a longitudinal channel extending through said torque rod from the distal end substantially along the length of said torque rod toward said first proximal end to form a tension mechanism having first and second tines operable to be positioned upon opposite sides of overlapped free ends of flexible load restraining strips,
        said first and second tines having a channel spacing between said tines at the proximal end of said torque rod that is less than the channel spacing at the distal end of said torque rod;
    a reaction arm connected to the proximal end of said torque rod for supporting said torque rod and ratchet rotation of said torque rod; and
    a ratchet mechanism connected to the proximal end of said torque rod for selectively providing ratchet rotation of said torque rod to tension the flexible load restraining strips by twisting the overlapping free ends of the flexible load restraining strips and thereby drawing the load restraining strips together to tension said load restraining strips across a load to be secured within a transport container.

2. An apparatus for tensioning flexible load restraining strips for use in securing cargo within a transport container as defined in claim 1 wherein:
    said first and second tines are coated on an exterior surface with polytetrafluroethylene.

3. An apparatus for tensioning flexible load restraining strips for use in securing cargo within a transport container as defined in claim 1 wherein:
    said first and second tines are enrobed with a polytetrafluroethylene coating.

4. An apparatus for tensioning flexible load restraining strips for use in securing cargo within a transport container as defined in claim 1 wherein:
    said first and second tines have a coating of polytetrafluroethylene on the interior tine surfaces formed by the channel between said tines.

5. An apparatus for tensioning flexible load restraining strips for use in securing cargo within a transport container as defined in claim 1 wherein:
    said channel spacing between said first and second tines of said torque rod uniformly increases from the proximal end of said torque rod to the distal end of said torque rod.

6. An apparatus for tensioning flexible load restraining strips for use in securing cargo within a transport container as defined in claim 1 wherein:
    the width of said channel between said first and second tines at said proximal end of said torque rod is approximately 0.3 inches and the width of said channel between said first and second tines at said distal end of said torque rod is approximately 0.4 inches.

7. An apparatus for tensioning flexible load restraining strips for use in securing cargo within a transport container as defined in claim 1 wherein:
    said first and second tines are semi-circular in cross-section.

8. An apparatus for tensioning flexible load restraining strips for use in securing cargo within a transport container as defined in claim 1 wherein:
    said first and second tines are generally rectangular in cross-section and the external configuration is approximately square.

9. An apparatus for tensioning flexible load restraining strips for use in securing cargo within a transport container as defined in claim 1 wherein:
    the exterior configuration of said first and second tines, in cross-section, is generally hexagonal.

10. An apparatus for tensioning flexible load restraining strips for use in securing cargo within a transport container as defined in claim 1 wherein:
    said torque rod is fabricated from titanium.

11. An apparatus for tensioning flexible load restraining strips for use in securing cargo within a transport container as defined in claim 1 wherein:
    said torque rod is fabricated from a titanium and vanadium alloy.

12. An apparatus for tensioning flexible load restraining strips for use in securing cargo within a transport container as defined in claim 1 wherein:
    said ratchet mechanism being operable to be set for selective rotation of said torque rod in either a clockwise or counterclockwise direction to tension the flexible load restraining strips across a load within a container.

* * * * *